US012517120B2

(12) United States Patent
Gong et al.

(10) Patent No.: US 12,517,120 B2
(45) Date of Patent: Jan. 6, 2026

(54) GLUCOSE-6-PHOSPHATE DEHYDROGENASE MUTANT AND USE THEREOF IN PREPARING DETECTION REAGENT

(71) Applicant: Beijing Strong Biotechnologies, Inc., Beijing (CN)

(72) Inventors: Jun Gong, Beijing (CN); Lanping Xiao, Beijing (CN); Jinxiang Qi, Beijing (CN); Qifei Zhang, Beijing (CN); Guili Wang, Beijing (CN); Xi Liu, Beijing (CN)

(73) Assignee: Beijing Strong Biotechnologies, Inc., Beijing (CN)

( * ) Notice: Subject to any disclaimer, the term of this patent is extended or adjusted under 35 U.S.C. 154(b) by 785 days.

(21) Appl. No.: 17/790,444

(22) PCT Filed: Nov. 4, 2020

(86) PCT No.: PCT/CN2020/126375
§ 371 (c)(1),
(2) Date: Jun. 30, 2022

(87) PCT Pub. No.: WO2021/139375
PCT Pub. Date: Jul. 15, 2021

(65) Prior Publication Data
US 2023/0243819 A1    Aug. 3, 2023

(30) Foreign Application Priority Data
Jan. 7, 2020    (CN) .......................... 202010013424.7

(51) Int. Cl.
| | | |
|---|---|---|
| *C12N 9/00* | (2006.01) | |
| *A61K 47/64* | (2017.01) | |
| *C12N 9/04* | (2006.01) | |
| *G01N 33/535* | (2006.01) | |
| *G01N 33/543* | (2006.01) | |

(52) U.S. Cl.
CPC ....... *G01N 33/54386* (2013.01); *A61K 47/64* (2017.08); *C12N 9/0006* (2013.01); *C12Y 101/01049* (2013.01); *G01N 33/535* (2013.01); *G01N 2470/10* (2021.08)

(58) Field of Classification Search
CPC .......... C12Y 101/01; C12Y 101/01049; G01N 33/535; G01N 33/54386; C12N 9/0006

USPC ......................................................... 435/7.6
See application file for complete search history.

(56) References Cited

U.S. PATENT DOCUMENTS

| | | |
|---|---|---|
| 6,455,288 B1 | 9/2002 | Jakobovits et al. |
| 2016/0010141 A1 | 1/2016 | Gaessler-Dietsche et al. |

FOREIGN PATENT DOCUMENTS

| | | |
|---|---|---|
| CN | 106190996 A | 12/2016 |
| CN | 110174363 A | 8/2019 |
| EP | 2770064 A1 | 8/2014 |
| WO | 2017220486 A2 | 12/2017 |

OTHER PUBLICATIONS

Chinese Notice of Allowance and granted claims (Chinese and English machine translation); China National Intellectual Property Administration; Chinese Application No. 202080024000.9; Oct. 10, 2022; 11 pages.
Written Opinion of the International Searching Authority; China National Intellectual Property Administration; International Application No. PCT/CN2020/126375; May 17, 2021; 11 pages.
International Preliminary Report on Patentability; The International Bureau of WIPO; International Application No. PCT/CN2020/126375; Jul. 12, 2022; 12 pages.
Office Action; State Intellectual Property Office; Chinese Application No. 202080024000.9; Apr. 1, 2022; 9 pages.
International Search Report; China National Intellectual Property Administration; International Application No. PCT/CN2020/126375; May 17, 2021; 10 pages.
Qi, Jinxiang et al.; Glucose-6-phosphate dehydrogenase mutant D306C has a higher inhibition rate for enzyme multiplied immunoassay of cholyglycine; Biotechnol. Appl. Biochem.; Jul. 2019; pp. 591-596; vol. 66, No. 4; Abstract only.

*Primary Examiner* — Tekchand Saidha
*Assistant Examiner* — Mohammad Y Meah
(74) *Attorney, Agent, or Firm* — Taft Stettinius & Hollister LLP

(57) ABSTRACT

Disclosed is a glucose-6-phosphate dehydrogenase mutant and a use thereof in preparing a detection reagent. Compared with a wild-type glucose-6-phosphate dehydrogenase mutant, the glucose-6-phosphate dehydrogenase mutant contains a combination of the following mutations: 56C, 306C, and 454C. A detection kit prepared by using the glucose-6-phosphate dehydrogenase has strong specificity, high sensitivity, convenient operation, a short detection time, accurate quantification, and is suitable for high-throughput detection.

14 Claims, 1 Drawing Sheet
Specification includes a Sequence Listing.

| | | |
|---|---|---|
| 1 | MVSEIKTLVTFFGGTGDLAKRKLYPSVFNLYKKGYLQKHFAIVGTARQALNDDEFKQLVR | 60 |
| 61 | DSIKDFTDDQAQAEAFIEHFSYRAHDVTDAASYAVLKEAIEEAADKFDIDGNRIFYMSVA | 120 |
| 121 | PRFFGTIAKYLKSEGLLADTGYNRLMIEKPFGTSYDTAAELQNDLENAFDDNQLFRIDHY | 180 |
| 181 | LGKEMVQNIAALRFGNPIFDAAWNKDYIKNVQVTLSEVLGVEERAGYYDTAGALLDMIQN | 240 |
| 241 | HTMQIVGWLAMEKPESFTDKDIRAAKNAAFNALKIYDEAEVNKYFVRAQYGAGDSADFKP | 300 |
| 301 | YLEELDVPADSKNNTFIAGELQFDLPRWEGVPFYVRSGKRLAAKQTRVDIVFKAGTFNFG | 360 |
| 361 | SEQEAQEAVLSIIIDPKGAIELKLNAKSVEDAFNTRTIDLGWTVSDEDKKNTPEPYERMI | 420 |
| 421 | HDTMNGDGSNFADWWNGVSIAWKFVDAISAVYTADKAPLETYKSGSMGPEASDKLLAANGD | 480 |

Figure 1

| | | |
|---|---|---|
| 1 | MVSEIKTLVTFFGGTGDLAKRKLYPSVFNLYKKGYLQKHFAIVGTARQALNDDEF<u>C</u>QLVR | 60 |
| 61 | DSIKDFTDDQAQAEAFIEHFSYRAHDVTDAASYAVLKEAIEEAADKFDIDGNRIFYMSVA | 120 |
| 121 | PRFFGTIAKYLKSEGLLADTGYNRLMIEKPFGTSYDTAAELQNDLENAFDDNQLFRIDHY | 180 |
| 181 | LGKEMVQNIAALRFGNPIFDAAWNKDYIKNVQVTLSEVLGVEERAGYYDTAGALLDMIQN | 240 |
| 241 | HTMQIVGWLAMEKPESFTDKDIRAAKNAAFNALKIYDEAEVNKYFVRAQYGAGDSADFKP | 300 |
| 301 | YLEEL<u>C</u>VPADSKNNTFIAGELQFDLPRWEGVPFYVRSGKRLAAKQTRVDIVFKAGTFNFG | 360 |
| 361 | SEQEAQEAVLSIIIDPKGAIELKLNAKSVEDAFNTRTIDLGWTVSDEDKKNTPEPYERMI | 420 |
| 421 | HDTMNGDGSNFADWWNGVSIAWKFVDAISAVYTA<u>C</u>KAPLETYKSGSMGPEASDKLLAANGD | 480 |

Figure 2

SEQUENCE LISTING

<160> NUMBER OF SEQ ID NOS: 2

<210> SEQ ID NO 1
<211> LENGTH: 486
<212> TYPE: PRT
<213> ORGANISM: Leuconostoc pseudomesenteroides

<400> SEQUENCE: 1

```
Met Val Ser Glu Ile Lys Thr Leu Val Thr Phe Phe Gly Gly Thr Gly
1               5                   10                  15

Asp Leu Ala Lys Arg Lys Leu Tyr Pro Ser Val Phe Asn Leu Tyr Lys
            20                  25                  30

Lys Gly Tyr Leu Gln Lys His Phe Ala Ile Val Gly Thr Ala Arg Gln
        35                  40                  45

Ala Leu Asn Asp Asp Glu Phe Lys Gln Leu Val Arg Asp Ser Ile Lys
    50                  55                  60

Asp Phe Thr Asp Asp Gln Ala Gln Ala Glu Ala Phe Ile Glu His Phe
65                  70                  75                  80

Ser Tyr Arg Ala His Asp Val Thr Asp Ala Ala Ser Tyr Ala Val Leu
                85                  90                  95

Lys Glu Ala Ile Glu Glu Ala Ala Asp Lys Phe Asp Ile Asp Gly Asn
            100                 105                 110

Arg Ile Phe Tyr Met Ser Val Ala Pro Arg Phe Phe Gly Thr Ile Ala
        115                 120                 125
```

Lys Tyr Leu Lys Ser Glu Gly Leu Leu Ala Asp Thr Gly Tyr Asn Arg
    130                 135                 140

Leu Met Ile Glu Lys Pro Phe Gly Thr Ser Tyr Asp Thr Ala Ala Glu
145                 150                 155                 160

Leu Gln Asn Asp Leu Glu Asn Ala Phe Asp Asp Asn Gln Leu Phe Arg
                165                 170                 175

Ile Asp His Tyr Leu Gly Lys Glu Met Val Gln Asn Ile Ala Ala Leu
            180                 185                 190

Arg Phe Gly Asn Pro Ile Phe Asp Ala Ala Trp Asn Lys Asp Tyr Ile
        195                 200                 205

Lys Asn Val Gln Val Thr Leu Ser Glu Val Leu Gly Val Glu Glu Arg
210                 215                 220

Ala Gly Tyr Tyr Asp Thr Ala Gly Ala Leu Leu Asp Met Ile Gln Asn
225                 230                 235                 240

His Thr Met Gln Ile Val Gly Trp Leu Ala Met Glu Lys Pro Glu Ser
                245                 250                 255

Phe Thr Asp Lys Asp Ile Arg Ala Ala Lys Asn Ala Ala Phe Asn Ala
            260                 265                 270

Leu Lys Ile Tyr Asp Glu Ala Glu Val Asn Lys Tyr Phe Gly Arg Ala
        275                 280                 285

Gln Tyr Gly Ala Gly Asp Ser Ala Asp Phe Lys Pro Tyr Leu Glu Glu
290                 295                 300

Leu Asp Val Pro Ala Asp Ser Lys Asn Asn Thr Phe Ile Ala Gly Glu
305                 310                 315                 320

Leu Gln Phe Asp Leu Pro Arg Trp Glu Gly Val Pro Phe Tyr Val Arg
                325                 330                 335

Ser Gly Lys Arg Leu Ala Ala Lys Gln Thr Arg Val Asp Ile Val Phe
            340                 345                 350

Lys Ala Gly Thr Phe Asn Phe Gly Ser Glu Gln Gly Ala Gln Glu Ala
        355                 360                 365

Val Leu Ser Ile Ile Asp Pro Lys Gly Ala Ile Glu Leu Lys Leu
370                 375                 380

Asn Ala Lys Ser Val Glu Asp Ala Phe Asn Thr Arg Thr Ile Asp Leu
385                 390                 395                 400

Gly Trp Thr Val Ser Asp Glu Asp Lys Lys Asn Thr Pro Glu Pro Tyr
                405                 410                 415

Glu Arg Met Ile His Asp Thr Met Asn Gly Asp Gly Ser Asn Phe Ala
            420                 425                 430

Asp Trp Asn Gly Val Ser Ile Ala Trp Lys Phe Val Asp Ala Ile Ser
        435                 440                 445

Ala Val Tyr Thr Ala Asp Lys Ala Pro Leu Glu Thr Tyr Lys Ser Gly
450                 455                 460

Ser Met Gly Pro Glu Ala Ser Asp Lys Leu Leu Ala Ala Asn Gly Asp
465                 470                 475                 480

Ala Trp Val Phe Lys Gly
                485

<210> SEQ ID NO 2
<211> LENGTH: 486
<212> TYPE: PRT
<213> ORGANISM: Artificial Sequence
<220> FEATURE:
<223> OTHER INFORMATION: Synthesized
<220> FEATURE:
<221> NAME/KEY: VARIANT
<222> LOCATION: (56)..(56)

<223> OTHER INFORMATION: G6PDH mutant, the amino acid at position 56 is
     replaced with C when compared with wild-type
<220> FEATURE:
<221> NAME/KEY: VARIANT
<222> LOCATION: (306)..(306)
<223> OTHER INFORMATION: G6PDH mutant, the amino acid at position 306 is
     replaced with C when compared with wild-type
<220> FEATURE:
<221> NAME/KEY: VARIANT
<222> LOCATION: (454)..(454)
<223> OTHER INFORMATION: G6PDH mutant, the amino acid at position 454 is
     replaced with C when compared with wild-type

<400> SEQUENCE: 2

Met Val Ser Glu Ile Lys Thr Leu Val Thr Phe Phe Gly Gly Thr Gly
1               5                   10                  15

Asp Leu Ala Lys Arg Lys Leu Tyr Pro Ser Val Phe Asn Leu Tyr Lys
            20                  25                  30

Lys Gly Tyr Leu Gln Lys His Phe Ala Ile Val Gly Thr Ala Arg Gln
        35                  40                  45

Ala Leu Asn Asp Asp Glu Phe Cys Gln Leu Val Arg Asp Ser Ile Lys
    50                  55                  60

Asp Phe Thr Asp Gln Ala Gln Ala Glu Ala Phe Ile Glu His Phe
65                  70                  75                  80

Ser Tyr Arg Ala His Asp Val Thr Asp Ala Ala Ser Tyr Ala Val Leu
            85                  90                  95

Lys Glu Ala Ile Glu Glu Ala Ala Asp Lys Phe Asp Ile Asp Gly Asn
        100                 105                 110

Arg Ile Phe Tyr Met Ser Val Ala Pro Arg Phe Phe Gly Thr Ile Ala
    115                 120                 125

Lys Tyr Leu Lys Ser Glu Gly Leu Leu Ala Asp Thr Gly Tyr Asn Arg
130                 135                 140

Leu Met Ile Glu Lys Pro Phe Gly Thr Ser Tyr Asp Thr Ala Ala Glu
145                 150                 155                 160

Leu Gln Asn Asp Leu Glu Asn Ala Phe Asp Asp Asn Gln Leu Phe Arg
            165                 170                 175

Ile Asp His Tyr Leu Gly Lys Glu Met Val Gln Asn Ile Ala Ala Leu
        180                 185                 190

Arg Phe Gly Asn Pro Ile Phe Asp Ala Ala Trp Asn Lys Asp Tyr Ile
    195                 200                 205

Lys Asn Val Gln Val Thr Leu Ser Glu Val Leu Gly Val Glu Glu Arg
210                 215                 220

Ala Gly Tyr Tyr Asp Thr Ala Gly Ala Leu Leu Asp Met Ile Gln Asn
225                 230                 235                 240

His Thr Met Gln Ile Val Gly Trp Leu Ala Met Glu Lys Pro Glu Ser
            245                 250                 255

Phe Thr Asp Lys Asp Ile Arg Ala Ala Lys Asn Ala Ala Phe Asn Ala
        260                 265                 270

Leu Lys Ile Tyr Asp Glu Ala Glu Val Asn Lys Tyr Phe Val Arg Ala
    275                 280                 285

Gln Tyr Gly Ala Gly Asp Ser Ala Asp Phe Lys Pro Tyr Leu Glu Glu
290                 295                 300

Leu Cys Val Pro Ala Asp Ser Lys Asn Asn Thr Phe Ile Ala Gly Glu
305                 310                 315                 320

Leu Gln Phe Asp Leu Pro Arg Trp Glu Gly Val Pro Phe Tyr Val Arg
            325                 330                 335

Ser Gly Lys Arg Leu Ala Ala Lys Gln Thr Arg Val Asp Ile Val Phe

-continued

```
                340                 345                 350
Lys Ala Gly Thr Phe Asn Phe Gly Ser Glu Gln Glu Ala Gln Glu Ala
            355                 360                 365

Val Leu Ser Ile Ile Ile Asp Pro Lys Gly Ala Ile Glu Leu Lys Leu
        370                 375                 380

Asn Ala Lys Ser Val Glu Asp Ala Phe Asn Thr Arg Thr Ile Asp Leu
385                 390                 395                 400

Gly Trp Thr Val Ser Asp Glu Asp Lys Lys Asn Thr Pro Glu Pro Tyr
                405                 410                 415

Glu Arg Met Ile His Asp Thr Met Asn Gly Asp Gly Ser Asn Phe Ala
                420                 425                 430

Asp Trp Asn Gly Val Ser Ile Ala Trp Lys Phe Val Asp Ala Ile Ser
            435                 440                 445

Ala Val Tyr Thr Ala Cys Lys Ala Pro Leu Glu Thr Tyr Lys Ser Gly
        450                 455                 460

Ser Met Gly Pro Glu Ala Ser Asp Lys Leu Leu Ala Ala Asn Gly Asp
465                 470                 475                 480

Ala Trp Val Phe Lys Gly
                485
```

GLUCOSE-6-PHOSPHATE DEHYDROGENASE MUTANT AND USE THEREOF IN PREPARING DETECTION REAGENT

CROSS-REFERENCE TO RELATED APPLICATIONS

This application is a U.S. National Phase of International PCT Application No. PCT/CN2020/126375, which was filed on Nov. 4, 2020, and which claims priority to Chinese Patent Application Serial No. 202010013424.7, which was filed on Jan. 7, 2020. The contents of each of those applications are incorporated herein by reference in their entireties.

SEQUENCE LISTING

This application incorporates by reference the material in the ASCII text file titled CHENG-34 Revised-Sequence.txt, which was created on Dec. 6, 2022 and is 9,043 bytes. This application also includes a PDF file that is identical to the ASCII text file titled CHENG-34 Revised-Sequence.txt.

FIELD OF THE INVENTION

The present application relates to the field of biological detection, in particular relates to enzyme glucose 6-phosphate dehydrogenase (abbr. G6PDH) with multi-site mutations, and the application thereof in a detection kit.

BACKGROUND OF THE INVENTION

Haptens, some small molecular substances (with molecular weight less than 4000 Da), cannot induce an immune response alone, and thus do not have immunogenicity. However, they can acquire immunogenicity and induce immune response when cross-link with or bind to a carrier such as macromolecular protein or non-antigenic polylysine. These small molecular substances can bind to a response effector and have antigenicity. Hapten is also known as incomplete antigen, since it is only immune-reactive, but not immunogenic.

Haptens can bind to the corresponding antibody to produce an antigen-antibody reaction, but they cannot initiate the human or animal body to produce an antibody alone. Most of polysaccharides, lipids, hormones, and small-molecule drugs are haptens. New immunogenicity will be acquired and then initiate animals to produce corresponding antibodies, if the haptens bind to certain protein molecule (carrier) by chemical methods.

Small molecule antigens (or haptens) cannot be detected by Sandwich-ELISA, due to the absence of more than two sites that can be used for sandwich method, and thus competition mode is generally used to detect haptens. The principle is that the antigen in the sample competes with a certain amount of enzyme-labeled antigen to bind to the solid phase antibody. The more antigen content in the sample, the less enzyme-labeled antigen bound to the solid phase and the lighter the color. This method is mostly used for ELISA determination of small molecule hormones and drugs.

Currently known methods for hapten detection mainly include: radioimmunoassay, enzyme-linked immunoassay, chemiluminescence immunoassay, high performance liquid chromatography, gas-liquid chromatography, gas chromatography and LC-MS. However, these detection methods all have many defects, for example, isotopes used in radioimmunoassay have many disadvantages such as radioactive contamination, short stability period and inconvenient operation, and enzyme-linked immunoassay is cumbersome and time-consuming, which is not suitable for clinical use. Although chemiluminescence has good sensitivity, it requires special equipment, and the high cost of use is not suitable for general use. In the process of clinical detection and diagnosis, Enzyme Multiplied Immunoassay Technique (EMIT) and latex-enhanced immunoturbidimetric assay are the main methods.

The principle of homogeneous enzyme immunoassay is: the enzyme-labeled antigen competes with the non-labeled antigen in a liquid homogeneous reaction system for binding to certain amount of antibody; the more the antibody binds to the non-labeled antigen, the more activity released by the enzyme-labeled antigen is and the more the NADH generated by enzymatic substrate NAD+. The content of the hapten in the liquid can be estimated by detecting the absorbance change at the wavelength of 340 nm.

The method in the prior art relies on the activation of the reactive group harbored by the haptens (such as small molecule drugs), which is then reacted with the enzyme. In such conjugation method, several small molecule drugs may be linked to the single glucose 6-phosphate dehydrogenase, it is difficult to ensure consistency of the coupling site, and thus it is difficult to ensure 1:1 directional reaction between the small molecule drug and the enzyme, thereby resulting in significant batch-to-batch variation.

SUMMARY OF THE INVENTION

In view of the needs in the art, the present application provides a novel glucose 6-phosphate dehydrogenase mutant and the use thereof in the preparation of detection reagents.

According to some embodiments, a glucose 6-phosphate dehydrogenase mutant is provided. The glucose 6-phosphate dehydrogenase mutant of the present application comprises a combination of the following mutations compared to wild-type: 56C, 306C and 454C.

The mutants of the present application are different from the glucose 6-phosphate dehydrogenase mutants in the published patents, such as US006090567A (Homogeneous immunoassays using mutant glucose-6-phosphate dehydrogenases), and also different from the glucose 6-phosphate dehydrogenases mutants disclosed in CN110174363A (which comprises a single mutation selected from D306C, D375C or G426C compared to wild-type).

According to some embodiments, a glucose 6-phosphate dehydrogenase mutant is provided, which is shown in the following sequence: SEQ ID No. 2.

According to some embodiments, there is provided a polynucleotide encoding the glucose 6-phosphate dehydrogenase mutant of the present application.

According to some embodiments, there is provided an expression vector comprising the polynucleotide of the present application.

According to some embodiments, there is provided a host cell comprising the expression vector of the present application. Host cells can be prokaryotic (e.g. bacteria) or eukaryotic (e.g. yeast).

According to some embodiments, there is provided a conjugate, which is obtained by conjugating the glucose 6-phosphate dehydrogenase mutant of the present application with a hapten at a molar ratio of 1:m.

In some embodiments, m is from 1 to 10, e.g., 1, 2, 3, 4, 5, 6, 7, 8, 9, 10.

In some specific embodiments, the glucose 6-phosphate dehydrogenase mutant of the present application is preferably directionally conjugated with the hapten at a molar ratio of 1:3.

In some specific embodiments, the hapten has a molecular weight of from 100 Da to 4000 Da, for example: 100, 150, 200, 250, 300, 350, 400, 410, 420, 430, 440, 450, 460, 470, 480, 490, 500, 520, 550, 570, 600, 620, 650, 700, 750, 800, 850, 900, 950, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000.

From the present application, the skilled person will understand that a "hapten" also includes derivative forms thereof. To facilitate the conjugation with glucose 6-phosphate dehydrogenase, haptens that do not harbor a conjugating group (e.g., a group that reacts with a sulfhydryl group) can be engineered to have a linker so that they can covalently bind to a sulfhydryl group. Therefore, in the present application, a hapten derivative refers to a hapten modified to have a sulfhydryl-reactive group.

The haptens are selected from the group consisting of: small molecule drugs (such as antibiotics, psychotropic drugs), hormones, metabolites, saccharide, lipids, amino acids, short peptides (with the molecular weight less than 4000 kDa, or with the amino acid length no longer than 50 amino acid residues).

The haptens are such as, but not limited to:

anticancer or antitumor drugs: taxane, paclitaxel and derivatives thereof, docetaxel, docetaxel, irinotecan, SN38, topotecan, topotecan hydrochloride, topotecan, cisplatin, carboplatin, oxaliplatin, camptothecin and derivatives thereof, hydroxycamptothecin, vinblastine, vincristine, emetine, emetine hydrochloride, colchicine, doxorubicin, epirubicin, pirarubicin, valrubicin, doxorubicin or doxorubicin hydrochloride, epirubicin, daunorubicin, daunomycin, mitomycin, aclacinomycin, idamycin, bleomycin, peplomycin, mithramycin, rapamycin, bleomycin, streptozotocin, podophyllotoxin, actinomycin D, maytansinoid, amikacin, mitoxantrone, all-trans retinoic acid, vindesine, vinorelbine, gemcitabine, capecitabine, cladribine, pemetrexed disodium, tegafur, letrozole, anastrozole, fulvestrant, goserelin, triptorelin, leuprolide, buserelin, temozolomide, cyclophosphamide, ifosfamide, gefitinib, sunitinib, erlotinib, icotinib, lapatinib, sorafenib, imatinib, dasatinib, nilotinib, sirolimus, everolimus, mercaptopurine, methotrexate, 5-fluorouracil, dacarbazine, hydroxyurea, vorinostat, ixabepilone, bortezomib, cytarabine, etoposide, azacytidine, teniposide, propranolol, procaine, tetracaine, lidocaine, bexarotene, carmustine, chlorambucil, methyl benzidine, thiotepa;

antibiotics, antiviral agents and antifungal agents: macrolides, defensins, polymyxin E mesylate, polymyxin, polymyxin B, capreomycin, bacitracin, gramicidin, amphotericin B, aminoglycoside antibiotics, gentamicin, paramecin, tobramycin, kanamycin, aminohydroxybutyl kanamycin A, neomycin, streptomycin, nystatin, echinocandins, carbenicillin, penicillin, penicillin-sensitive agents, penicillin G, penicillin V, penicillinase-resistant agents, methicillin, oxacillin, cloxacillin, dicloxacillin, flucloxacillin, nafcillin, penem, amoxicillin, vancomycin, daptomycin, anthracycline, chloramphenicol, erythromycin cydocarbonate, flavomycin, oleandomycin, troleandomycin, clarithromycin, erythromycin, dirithromycin, roxithromycin, nitrogen erythromycin, azithromycin, flurithromycin, josamycin, spiramycin, midecamycin, medegomycin, albomycin, miocamycin, rokitamycin, doxycycline, sinolide A, teicoplanin, rampolanin, mideplanin, cristine, fluorocytosine, miconazole, econazole, fluconazole, itraconazole, ketoconazole, voriconazole, clotrimazole, bifonazole, netilmicin, amikacin, caspofungin, micafungin, terbinafine, fluoroquinolone, lomefloxacin, norfloxacin, ciprofloxacin, enoxacin, ofloxacin, levofloxacin, trovafloxacin, alatrofloxacin, moxifloxacin, grepafloxacin, gatifloxacin, sparfloxacin, temafloxacin, pefloxacin, amifloxacin, fleroxacin, tosufloxacin, prulifloxacin, irloxacin, pazufloxacin, clinafloxacin, sitafloxacin, idarubicin, tosufloxacin, ramoplanin, nucleoside antiviral agent, ribavirin, anti-pseudomonas penicillin, ticarcillin, azlocillin, mezlocillin, piperacillin, ampicillin, hetacillin, grabicillin, amoxicillin, cephalosporin, cefpodoxime, cefprozil, cefobutene, cefazoxime, ceftriaxone, cefotaxime, cefpirin, cephalexin, cefradine, cefoxitin, cefmandole, cefazolin, cefloridine, cefaclor, cefadroxil, cefalexin, cefuroxime, cephrete, cefotaxime, cefprozil, cefepime, cefixime, cefonicil, cefoperazone, cefotetan, cefmetazole, ceftazidime, loracarbef, moxalactam, ceftibuten, cephalosporins II, ceftriaxone, cyanoacetyl cephalosporins, monobactams, aztreonam, carbapenems, imipenem, pentanamidine hydroxyethesulfonate, imipenem, meropenem, pentamidine isotherthiourea, salbutamol sulfate, lidocaine, oxinarine sulfate, beclomethasone, m-hydroxyisoproterenol sulfate, beclomethasone dipropionate, triamcinolone acetamide, budesonide, budesonide acetonide, fluticasone, ipratropium bromide, flunisolide, sodium cromoglicate, cyclosporine, cyclosporine A, ergotamine tartrate;

cytochalasin B, aminomethylbenzoic acid, sodium aminohippurate, aminoglutethimide, aminolevulinic acid, aminosalicylic acid, pamidronic acid, amsacrine, anagrelide, anastrozole, lewamizol, busulfan, cabergoline, leuplin, sodium cilastatin, disodium clodronate, amiodarone, ondansetron, deacetylcycloprochlorometerone, megestrol, testosterone, estramustine, exemestane, fluorohydroxymethyl testosterone, diethylstilbestrol, fexofenadine, fludarabine, fludrocortisone, fluticasone, deferoxamine, flutamide, bicalutamide, thalidomide, L-dopa, leucovorin, lisinopril, levothyroxine sodium, nitrogen mustard, medroxyprogesterone, m-hydroxy norhedrine ditartrate, mexiletine, mitotane, nicotine, nilutamide, octreotide, pentostatin, plicamycin, porfimer, prednisone, procarbazine, prulopiperazine, raltitrexed, streptozotocin, sirolimus, tacrolimus, tamoxifen, teniposide, tetrahydrocannabinol, thioguanine, thiotepa, dolasetron granisetron, formoterol, melphalan, midazolam, alprazolam, sumatriptan, low molecular weight heparin, amifostine, carmustine, Gemcitabine, lomustine, teixobactin, aspirin, salicylic acid, phenylbutazone, indomethacin, naproxen, diclofenac, meloxicam, nabumetone, etodolac, sulindac, acemetacin, diacerein, Amdoxovir, cyanuric blue, arylaminoketone, aminocaproic acid, aminophenedoperidone, aminolevulinic acid, butylene glycol diester mesylate, chloromethyl bisphosphoric acid, disodium chloromethylbisphosphate, L-dihydroxyphenylalanine, dichloromethyldiethylamine, m-hydroxylamine bitartrate, o-dichlorobenzene dichloroethane, prochlorperazine, ondan setron, raltitrexed tacrolimus, tamoxifen, Tanipstead, tetrahydrocannabinol, aroyl hydrazone, sumatriptan, Miocamycin, Rokitamycin, phenesterine, piposulfan, Epistin hydrochloride, insulin, antisense nucleotides, small molecular RNA, Vitamin D, 25-hydroxyvitamin D, 1,25-dihydroxyvitamin D, folic acid, cardiac glycosides, mycophenolic acid, amiodarone, methotrexate, tacrolimus, serum amino acids, bile acids, glycocholic acid, phenylalanine, ethanol, nicotinic metabolites, urinary morphine, urinary monohydric phenol derivatives, neuropeptide tyrosine, plasma galanin, polyamines, histamine, thyroid stimulating hormone, prolactin, placental lactation, growth hormone, follicle-stimulating hormone, luteinizing hormone, adrenocorticotrophic hormone, antidiuretic hormone, calcitonin, procalcitonin, parathyroid hormone, thyroxine, triiodothyronine, trans triiodothyronine, free thyroxine, free triiodothyronine, cortisol, urinary 17-hydroxycorticosteroid, urinary 17-ketosteroid, dehydroepiandrosterone and sulfate, aldosterone, urinary vanillic acid, plasma renin, angiotensin, erythropoietin, testosterone, dihydrotestosterone, androstenedione, 17a hydroxyprogesterone, estrone, estriol, estradiol, progesterone, human chorionic gonadotropin, Insulin, proinsulin, C-peptide, gastrin, plasma prostaglandin, plasma 6-ketoprostaglandin F1a, prostacyclin, epinephrine, catecholamine, norepinephrine, cholecystokinin, naloxine, cyclic adenosine monophosphate, cyclic guanosine monophosphate, vasoactive peptide, somatostatin, secretin, substance P, neurotensin, thromboxane A2, thromboxane B2, serotonin, neuropeptide Y, osteocalcin.

In specific embodiments, the hapten is tobramycin or derivative thereof.

Although tobramycin is used as a specific example, the skilled person can understand that the technical effect of the present application does not depend on the specific type of hapten, and other hapten that can be immunologically detected by the competitive method is applicable.

In a specific embodiment, the hapten is a derivative of tobramycin, bearing a sulfhydryl-reactive group such as maleimide, bromoacetyl, vinyl sulfone, or aziridine.

In a specific embodiment, the hapten is a derivative of tobramycin, as shown in formula I:

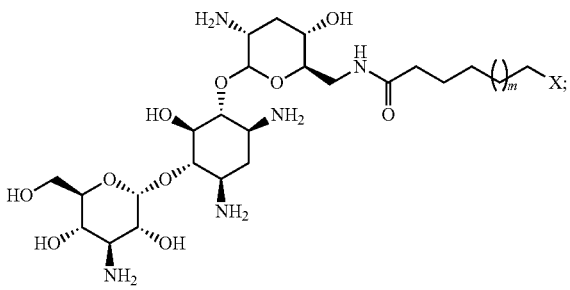

Formula I m is an integer from 0 to 20, preferably an integer from 1 to 10, preferably an integer from 1 to 6;

X is selected from the group consisting of: maleimide, bromoacetyl, vinyl sulfone and aziridine;

more preferably, X is maleimide.

In a specific embodiment, the hapten is a derivative of tobramycin, as shown in formula II:

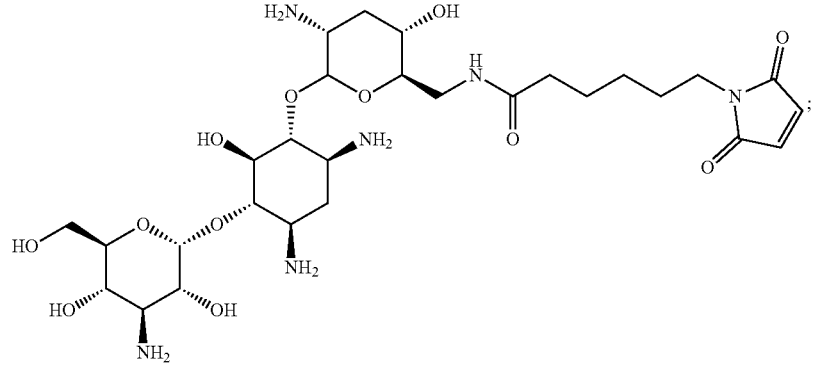

Formula II

According to some embodiments, there is provided a reagent comprising the conjugate of the present application.

According to some embodiments, there is provided use of the glucose 6-phosphate dehydrogenase mutant of the present application in the preparation of detection reagents.

According to some embodiments, there is provided use of the conjugate of the present application in the preparation of detection reagents.

In a specific embodiment, the detection reagent is selected from the group consisting of: an enzyme-linked immunoassay detection reagent, a chemiluminescence immunoassay detection reagent, a homogeneous enzyme immunoassay detection reagent, and a latex-enhanced immune turbidimetric detection reagent.

In a specific embodiment, the detection reagent is preferably a competition-based detection reagent.

According to some embodiments, there is provided a kit for detection of hapten, comprising:
  a first reagent comprising a substrate and an antibody against hapten; the substrate is a substrate for glucose 6-phosphate dehydrogenase;
  a second reagent comprising the conjugate of the present application;
  optionally, a calibrator comprising 10 mM to 500 mM buffer and a hapten; and
  optionally, a quality control comprising 10 mM to 500 mM buffer and a hapten.

According to one embodiment, there is provided a kit for detection of hapten, comprising:
  a first reagent comprising:
  10 mM to 500 mM buffer,
  5 mM to 25 mM substrate,
  0.01 µg/L to 1 mg/L antibody against hapten,
  10 mM to 300 mM NaCl,
  0.1 g/L to 5 g/L stabilizer,
  0.1 g/L to 5 g/L surfactant,
  0.1 g/L to 5 g/L preservative;
  a second reagent comprising:
  10 mM to 500 mM buffer,
  0.01 µg/L to 1 mg/L of the conjugate of the present application,
  0.1 g/L to 5 g/L stabilizer,
  0.1 g/L to 5 g/L surfactant,
  0.1 g/L to 5 g/L preservative.

According to some specific embodiments, there is provided a kit for detection of tobramycin, comprising:
  a first reagent comprising a substrate and an antibody against tobramycin; the substrate is a substrate for glucose 6-phosphate dehydrogenase;
  a second reagent comprising the conjugate of the present application;
  optionally, a calibrator comprising 10 mM to 500 mM buffer, tobramycin with known concentration; and
  optionally, a quality control comprising 10 mM to 500 mM buffer and tobramycin with known concentration.

According to one embodiment, there is provided a kit for detection of tobramycin, comprising:
  a first reagent comprising:
  10 mM to 500 mM buffer,
  5 mM to 25 mM substrate,
  0.01 µg/ml to 10 µg/ml antibody against tobramycin,
  10 mM to 300 mM NaCl,
  0.1 g/L to 5 g/L stabilizer,
  0.1 g/L to 5 g/L surfactant,
  0.1 g/L to 5 g/L preservative;
  a second reagent comprising:
  10 mM to 500 mM buffer,
  0.01 µg/ml to 10 µg/ml of the conjugates of the present application,
  0.1 g/L to 5 g/L stabilizer,
  0.1 g/L to 5 g/L surfactant,
  0.1 g/L to 5 g/L preservative.

In some embodiments, the buffer is selected from one or a combination of the following: tromethamine buffer, phosphate buffer, Tris-HCl buffer, citric acid-sodium citrate buffer, barbiturate buffer, glycine buffer, borate buffer and trihydroxymethyl methane buffer; preferably, phosphate buffer; the concentration of the buffer is from 10 mmol/L to 500 mmol/L, preferably 100 mM; the pH of the buffer is 6.5 to 8.0, preferably 7.2 or 7.0.

In some embodiments, the stabilizer is selected from the following one or a combination of: bovine serum albumin, trehalose, glycerol, sucrose, mannitol, glycine, arginine, polyethylene glycol 6000 and polyethylene glycol 8000; preferably bovine serum albumin.

In some embodiments, the surfactant is selected from the following one or a combination of: Brij23, Brij35, Triton X-100, Triton X-405, Tween20, Tween30, Tween80, coconut oil fatty acid diethanolamide and AEO7, preferably Tween20.

In some embodiments, the preservative is selected from one or a combination of the following: azide, MIT, PC-300 and thimerosal; the azide is selected from sodium azide or lithium azide.

In some embodiments, the substrate comprises: glucose 6-phosphate and β-nicotinamide adenine dinucleotide.

According to some embodiments, there is provided a method of preparing a conjugate, comprising the steps of:
  1) providing the hapten or derivative thereof according to the present application, especially providing the hapten or derivative thereof according to the present application in an aprotic solvent (such as but not limited to acetonitrile, dimethylformamide, dimethyl sulfoxide);
  2) providing the glucose 6-phosphate dehydrogenase mutant of the present application, preferably providing the glucose 6-phosphate dehydrogenase mutant in a buffer (which provides a reaction environment, such as, but not limited to, PBS, Tris, TAPS, TAPSO, pH of the buffer is from 6.0 to 8.0);
  3) contacting the glucose 6-phosphate dehydrogenase mutant with the hapten or derivative thereof at 18° C. to 28° C. at a molar ratio of 1:n for 1 hour to 4 hours, preferably for 2 hours to 3 hours, so that the hapten or derivative thereof is conjugated with the glucose 6-phosphate dehydrogenase mutant to obtain the conjugate;
  4) optionally purifying the conjugate as required, such as by desalting treatment, etc.

In some embodiments, n is from 1 to 500, e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 60, 70, 80, 90, 100, 150, 200, 250, 300, 350, 400, 450, 500 or range between any above values.

In some specific embodiments, the glucose 6-phosphate dehydrogenase mutant is in contacted with the hapten or derivative hereof at a molar ratio of 1:30 to 1:120, the following can be mentioned: 1:30, 1:40, 1:50, 1:60, 1:70, 1:80, 1:90, 1:100, 1:110 or 1:120.

In some specific embodiments, steps 1) and 2) are interchangeable or in parallel.

In some specific embodiments, the glucose 6-phosphate dehydrogenase comprises a free sulfhydryl group prior to conjugation, allowing a 1:3 directional reaction with hapten or derivative thereof.

DESCRIPTION OF THE DRAWINGS

FIG. 1. G6PDH (wild-type) amino acid sequence (SEQ ID No. 1); derived from *Leuconostoc pseudomesenteroides* of *Leuconostoc* spp.

FIG. 2. G6PDH mutant (SEQ ID No. 2).

DETAILED DESCRIPTION OF THE INVENTION

Examples

Example 1. Synthesis of Tobramycin Derivatives

Tobramycin (98 mg, 0.21 mmol) and Compound 1 (64 mg, 0.21 mmol) were dissolved in 5 mL of water, and stirred at room temperature for 5 h. The Tobramycin derivative were obtained by HPLC separation. The synthetic route was as follows:

The structure of the synthesized product was confirmed by conventional methods. The effect of this embodiment is to make small molecule antigens (or haptens) bear a group that can bind to an enzyme, and the technical effect of the present application does not depend on the specific hapten derivative.

Example 2. Preparation of Mutants

The desired DNAs, for example, were synthesized by using well-known genetic engineering methods, inserted into an appropriate expression vector (such as *E. coli* expression vector), expressed in the expression host, and purified (such as affinity purification), resulting in the enzyme mutant shown in SEQ ID No. 2.

Example 3. Conjugation of Tobramycin Derivative to G6PDH Mutant

The G6PDH-Tobramycin conjugate of the present application was obtained in the following manner: the sulfhydryl-reactive group (such as maleimide group) on the tobramycin derivative molecule was covalently bound to the sulfhydryl group on the G6PDH molecule.

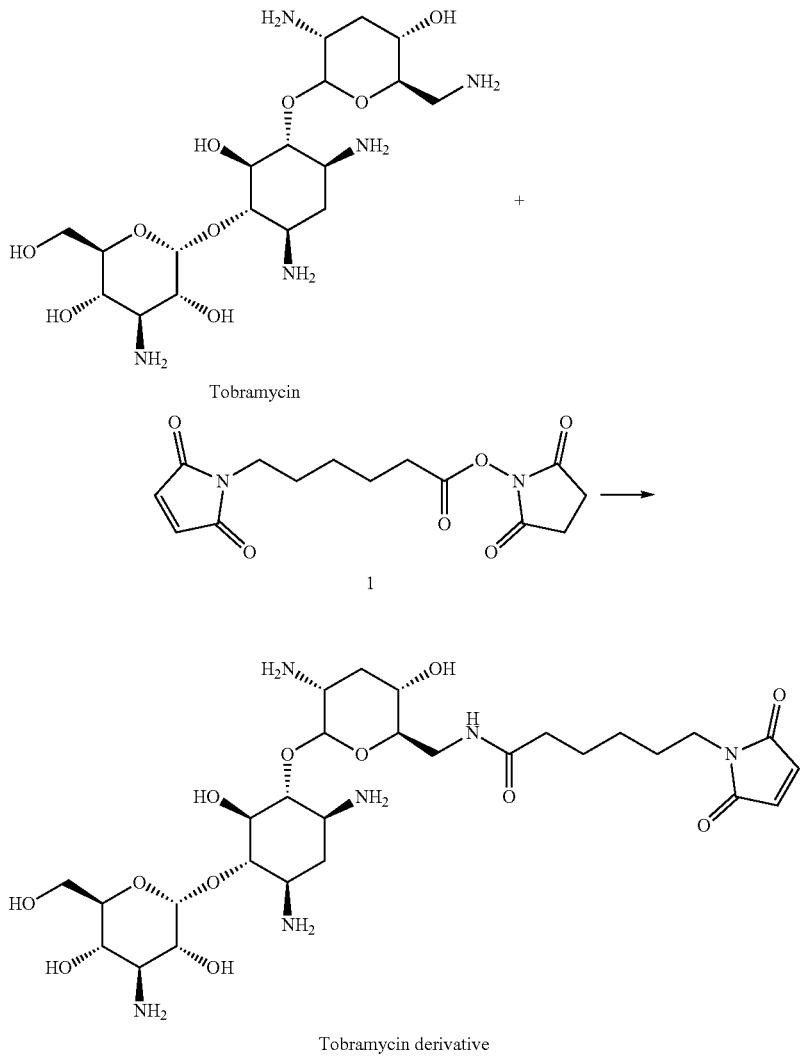

4 μl of the solution containing the G6PDH enzyme mutant of Example 2 (or the control G6PDH enzyme mutant of the prior art) (5 mg/mL enzyme, 100 mmol PB, 100 mmol NaCl, pH=8.0), 200 μl PB solution, and 800 μl tobramycin derivative prepared in Example 1 were reacted with shaking at room temperature (18 to 28° C., preferably 20 to 25° C.) for 2.5 h.

After treated with desalting column (desalting solution: 100 mM PB, 0.1% NaN3, 1% NaCl, pH=8.0), the protein peaks were pooled to obtain the G6PDH-tobramycin conjugate.

Example 4. Preparation of the Kit

The kit for the detection of tobramycin was prepared, including:

1. Preparation of the First Reagent:
    HEPES buffer 100 mM, pH 7.0
    Anti-tobramycin antibody 0.5 μg/ml
    β-nicotinamide adenine dinucleotide, oxidized, 15 mmol/L
    Glucose 6-phosphate 15 mmol/L
    Bovine Serum Albumin 1 g/L
    Tween 20 1 g/L
    Sodium azide 1 g/L;
2. Preparation of the Second Reagent:
    PB buffer 100 mM, pH8.0
    G6PDH-tobramycin conjugate 0.1 μg/ml
    Bovine Serum Albumin 1 g/L
    Tween 20 1 g/L
    Sodium azide 1 g/L.
3. Calibrator:
    The pure tobramycin was diluted by buffer solution (100 mM HEPES buffer) to reach concentrations of 0, 0.6, 2.0, 4.0, 6.0, 10.0 mg/L (or added as needed);
4. Quality Control:
    The pure tobramycin was diluted by buffer solution (100 mM HEPES buffer) to reach concentrations of 1.5 mg/L, 3 mg/L, 8 mg/L (or added as needed).

Test Examples

TABLE 1

| Parameters of automatic biochemical analyzer | |
| --- | --- |
| Detector model | Hitachi 7180 parameters |
| Analysis point | [Rate-A][10][20][24] |
| WAVE(SUB/MAIN) | [405] [340] |
| S.VIL. | [12.0] |
| S.R1 | [150] |
| S.R3 | [50] |
| ABS.LIMIT: | [32000] [increment] |
| CALIB TYPE: | [logit-log(3P)] |
| POINT: | [6] SPAN PONIT[6] |
| Calibrator | 0.0, 0.6, 2.0, 4.0, 6.0, 10.0 mg/L |
| Samples | Samples to be tested, such as serum, plasma, urine, saliva, cerebrospinal fluid, ascite, whole blood, secretion |

Test Example 1. Calibration Absorbance of the Tobramycin Detection Kit

TABLE 2

| Calibration Absorbance of the Tobramycin Detection Kit | | | | |
| --- | --- | --- | --- | --- |
| | Reagents of the present application | | | |
| Calibrator | Read 1 | Read 2 | Mean | S/S1 |
| 1 | 1832 | 1827 | 1829.5 | 151.93% |
| 2 | 1935 | 1915 | 1925.0 | 105.22% |
| 3 | 2132 | 2122 | 2127.0 | 110.49% |
| 4 | 2377 | 2351 | 2364.0 | 111.14% |
| 5 | 2519 | 2529 | 2524.0 | 106.77% |
| 6 | 2779 | 2780 | 2779.5 | 110.12% |

Test Example 2. Repeatability of the Tobramycin Detection Kit

High, medium and low quality control were repeatedly determined for 20 times. The repeatability CV of the kit of the present invention was less than 2.61%, indicating that the repeatability is favorable.

TABLE 3

| Repeatability | | | |
| --- | --- | --- | --- |
| Test number | Quality control 1 | Quality control 2 | Quality control 3 |
| 1 | 1.62 | 2.89 | 8.10 |
| 2 | 1.67 | 2.85 | 8.13 |
| 3 | 1.65 | 2.86 | 8.04 |
| 4 | 1.64 | 2.89 | 8.01 |
| 5 | 1.67 | 2.89 | 8.28 |
| 6 | 1.60 | 2.82 | 8.35 |
| 7 | 1.62 | 2.82 | 8.19 |
| 8 | 1.56 | 2.82 | 8.09 |
| 9 | 1.62 | 2.84 | 8.17 |
| 10 | 1.59 | 2.88 | 8.25 |
| 11 | 1.55 | 2.81 | 8.04 |
| 12 | 1.58 | 2.83 | 8.17 |
| 13 | 1.66 | 2.85 | 8.03 |
| 14 | 1.59 | 2.84 | 8.06 |
| 15 | 1.51 | 2.87 | 8.28 |
| 16 | 1.58 | 2.85 | 8.16 |
| 17 | 1.61 | 2.86 | 7.94 |
| 18 | 1.57 | 2.75 | 8.02 |
| 19 | 1.59 | 2.77 | 8.15 |
| 20 | 1.58 | 2.85 | 8.10 |
| Mean | 1.60 | 2.84 | 8.13 |
| STD | 0.04 | 0.04 | 0.11 |
| CV | 2.61% | 1.31% | 1.30% |

Test Example 3. Linearity of the Tobramycin Detection Kit

The screened low-value and high-value samples were arithmetically diluted. Each sample was repeatedly tested for 3 times. The average value of the measured concentration and the theoretical concentration were analyzed to evaluate the recovery rate, indicating that the deviation of the results was less than 10%, and the linear performance reached 10 μg/ml.

TABLE 4

| | \multicolumn{7}{c}{Linearity} |
|---|---|---|---|---|---|---|---|
| | Measured value 1 | Measured value 2 | Measured value 3 | Mean | Theoretical value | Relative deviation | Absolute deviation |
| 1 | 0.53 | 0.51 | 0.57 | 0.54 | 0.55 | −0.02 | −2.81% |
| 2 | 1.51 | 1.48 | 1.53 | 1.51 | 1.53 | −0.03 | −1.73% |
| 3 | 2.49 | 2.40 | 2.46 | 2.45 | 2.51 | −0.06 | −2.55% |
| 4 | 3.46 | 3.48 | 3.43 | 3.46 | 3.50 | −0.04 | −1.10% |
| 5 | 4.48 | 4.50 | 4.46 | 4.48 | 4.48 | 0.00 | 0.08% |
| 6 | 5.53 | 5.33 | 5.47 | 5.44 | 5.46 | −0.01 | −0.25% |
| 7 | 6.53 | 6.50 | 6.51 | 6.51 | 6.44 | 0.08 | 1.17% |
| 8 | 7.61 | 7.60 | 7.61 | 7.61 | 7.42 | 0.19 | 2.53% |
| 9 | 8.51 | 8.56 | 8.47 | 8.51 | 8.40 | 0.11 | 1.35% |
| 10 | 9.56 | 9.48 | 9.48 | 9.51 | 9.38 | 0.13 | 1.34% |
| 11 | 10.02 | 10.10 | 9.92 | 10.01 | 10.36 | −0.35 | −3.37% |

Test Example 4. Accuracy

The pure tobramycin product of the US Pharmacopoeia was dissolved at various concentrations as stock solutions, and then equally diluted in the serum (diluted by at least 20 times) to prepare tobramycin solutions with different serum concentrations. The kit of the present invention was used to measure and calculate the deviation from the theoretical value. The results showed that the deviation of the recovery rate was less than 6%, and the accuracy was favorable.

TABLE 5

| | | | | | | Accuracy |
|---|---|---|---|---|---|---|
| USP | Measured value 1 | Measured value 2 | Measured value 3 | Mean | Absolute deviation | Relative deviation |
| 1.00 | 1.06 | 1.08 | 1.04 | 1.06 | 0.06 | 6.00% |
| 1.50 | 1.59 | 1.52 | 1.51 | 1.54 | 0.04 | 2.67% |
| 2.00 | 2.02 | 1.98 | 2.04 | 2.01 | 0.01 | 0.67% |
| 4.00 | 3.04 | 2.94 | 2.97 | 2.98 | −0.02 | −0.56% |
| 8.00 | 5.09 | 4.95 | 4.99 | 5.01 | 0.01 | 0.20% |
| 10.00 | 10.12 | 10.01 | 10.05 | 10.06 | 0.06 | 0.60% |

Test Example 5. Antibody Inhibition Rate

1. Detection Principle of Antibody Inhibition Rate

When the antibody binds to the G6PDH-tobramycin conjugate, the G6PDH enzyme activity is affected due to steric hindrance, which reduces the efficiency of the enzyme to catalyze the conversion of NAD to NADH. The difference between the experimental groups with and without the antibody can be compared by detecting the change in NADH amount, and such difference reflects the inhibitory ability of the antibody to G6PDH.

2. Reaction System:

TABLE 6

| \multicolumn{2}{l}{Preparation of detection reagents for antibody inhibition rate} |  |
|---|---|
| RI (with antibody) | Final concentration |
| 0.1M PB/K (pH = 7.2) | 0.1M |
| G6P | 15 mM |
| P-NAD | 15 mM |
| Ab | 1% |
| R1 (without antibody) | Final concentration |
| 0.1M PB/K (pH = 7.2) | 0.1M |
| G6P | 15 mM |
| β-NAD | 15 mM |

TABLE 7

Detection parameters for antibody inhibition rate

| | |
|---|---|
| Detector model | Hitachi 7180 |
| analysis/time/point | 2 point rate/10 min/10-15 points |
| R1/S | 150:25 |
| Wavelength (Sub/Primary) | 405/340 |
| Type of reaction | Increment |

3. Results:

The inhibition of G6PDH by the antibody could be obtained by comparing the absorbance of the G6PDH-tobramycin conjugate when the antibody was added or not.

$$\text{Antibody inhibition rate} = \left[1 - \frac{\Delta A(\text{with antibody})}{\Delta A(\text{without antibody})}\right] * 100\%$$

where ΔA refers to the difference in absorbance between the two test time points on the reaction curve.

TABLE 8

Antibody inhibition rates of different G6PDH mutants

| | (ΔA absorbance) 340 nm | | |
|---|---|---|---|
| G6PDH mutant | Group without antibody | Group with antibody | Inhibition rate |
| K56C | 2218 | 1983 | 10.60% |
| D105C | 1994 | 1925 | 3.46% |
| D259C | 1850 | 1674 | 9.51% |
| D306C | 2011 | 1992 | 0.94% |
| D454C | 2043 | 1891 | 7.44% |
| D375C | 2566 | 2523 | 1.68% |
| G426C | 2363 | 2302 | 2.58% |
| A45C | 2150 | 2133 | 0.79% |
| K56C/D306C/D454C | 1998 | 1145 | 42.69% |

Although not limited to a specific theory, it can be partially explained that compared with the G6PDH mutants in the prior art, the mutation sites (i.e. the sites where free sulfhydryl groups are introduced) in the enzyme mutant of the present application (K56C/D306C/D454C) are the locations for conjugating with haptens (such as hormones, small molecule drugs, etc.). When the hapten binds to the hapten-specific antibody at these positions, the steric hindrance formed has the largest effect on the activity of the G6PDH enzyme, and at the same time, the steric folding of the molecule cannot be substantially affected after the mutations are introduced. Therefore, the location of these mutation sites is very important, and it is necessary to take into account the activity of the G6PDH enzyme, the spatial folding of the conjugate molecule, and also the adequate exposure of the hapten epitope.

Since the mutant of the enzyme has a significant increase in the antibody inhibition rate, it has obvious advantages in the calibration of the absorbance. After the conjugate formed by the enzyme mutant and the hapten is formulated into a kit, the performance of the reagent is significantly improved in terms of repeatability, total imprecision, linearity, and specificity.

What is claimed is:

1. A glucose 6-phosphate dehydrogenase mutant, which comprises a combination of the following mutations compared to *Leuconostoc pseudomesenteroides* wild-type glucose 6-phosphate dehydrogenase of SEQ ID NO: 1: 56C, 306C and 454C.

2. A conjugate, which is obtained by conjugating the glucose 6-phosphate dehydrogenase mutant of claim 1 with a hapten at a molar ratio of 1: m;
   m is from 1 to 3.

3. A reagent comprising the conjugate of claim 2.

4. A detection kit comprising:
   a first reagent comprising a substrate, an anti-hapten antibody, and a buffer;
   a second reagent comprising the conjugate of claim 2 and a buffer;
   optionally, a calibrator comprising 10 mM to 500 mM buffer, a hapten with known concentration; and
   optionally, a quality control comprising 10 mM to 500 mM buffer and a hapten with known concentration.

5. The detection kit according to claim 4, comprising:
   a first reagent comprising:
   10 mM to 500 mM buffer,
   5 mM to 25 mM substrate,
   0.01 µg/L to 1 mg/L anti-hapten antibody,
   10 mM to 300 mM NaCl,
   0.1 g/L to 5 g/L stabilizer,
   0.1 g/L to 5 g/L surfactant,
   0.1 g/L to 5 g/L preservative;
   a second reagent comprising:
   10 mM to 500 mM buffer,
   0.01 µg/L to 1 mg/L conjugate of claim 2,
   0.1 g/L to 5 g/L stabilizer,
   0.1 g/L to 5 g/L surfactant,
   0.1 g/L to 5 g/L preservative;
   the buffer is selected from one or a combination of the following: tromethamine buffer, phosphate buffer, Tris-HCl buffer, citric acid-sodium citrate buffer, barbiturate buffer, glycine buffer, borate buffer and trihydroxymethyl methane buffer;
   the buffer of the first reagent and the buffer of the second reagent are the same or different;
   the concentration of the buffer is 10 mmol/L to 500 mmol/L;
   the pH of the buffer is 6.5 to 8.0;
   the stabilizer is selected from the following one or a combination of: bovine serum albumin, trehalose, glycerol, sucrose, mannitol, glycine, arginine, polyethylene glycol 6000 and polyethylene glycol 8000;
   the surfactant is selected from the following one or a combination of: Brij23, Brij35, Triton X-100, Triton X-405, Tween20, Tween30, Tween80, coconut oil fatty acid diethanolamide and AEO7;
   the preservative is selected from the following one or a combination of: azide, MIT, PC biological preservative and thimerosal;
   the azide is selected from the group consisting of: sodium azide, lithium azide and PC-300;
   the substrate comprises: glucose 6-phosphate and β-nicotinamide adenine dinucleotide.

6. A method of preparing a conjugate, comprising the steps of:
   1) providing the glucose 6-phosphate dehydrogenase mutant of claim 1;
   2) providing a hapten;
   3) conjugating the glucose 6-phosphate dehydrogenase mutant with the hapten at a molar ratio of 1:3;
   step 1) and step 2) are in parallel or in interchangeable succession;
   the hapten has a molecular weight of 100 Da to 4000 Da.

7. The method of preparing a conjugate according to claim 6, comprising the steps of:
   1) Providing the glucose 6-phosphate dehydrogenase mutant;
   2) providing the hapten or derivative thereof;
   3) contacting the glucose 6-phosphate dehydrogenase mutant with the hapten or derivative thereof at 18° C. to 28° C. for 1 hour to 4 hours so that the hapten or derivative thereof is conjugated with the glucose 6-phosphate dehydrogenase mutant to obtain the conjugate;

4) optionally, purifying the conjugate;
step 1) and step 2) are interchangeable or in parallel;
the buffer is selected from the group consisting of: PBS, Tris, TAPS and TAPSO,
The pH of the buffer is 6.0 to 8.0.

8. The glucose 6-phosphate dehydrogenase mutant of claim 1 which is shown in SEQ ID No.2.

9. The conjugate of claim 2, wherein the hapten is selected from the group consisting of: small molecule drugs, antibiotics, hormones, metabolites, polysaccharides, lipids and short peptides;
the hapten has a molecular weight of 100 Da to 4000 Da.

10. The detection kit according to claim 5, comprising:
a first reagent comprising:
   100 mM to 300 mM buffer,
   5 mM to 25 mM substrate,
   0.01 µg/L to 1 mg/L anti-hapten antibody,
   100 mM to 300 mM NaCl,
   1 g/L to 5 g/L stabilizer,
   1 g/L to 5 g/L surfactant,
   1 g/L to 5 g/L preservative;
a second reagent comprising:
   100 mM to 300 mM buffer,
   0.05 µg/L to 0.5 mg/L conjugate of claim 5,
   1 g/L to 5 g/L stabilizer,
   1 g/L to 5 g/L surfactant,
   1 g/L to 5 g/L preservative;
the stabilizer is bovine serum albumin;
the surfactant is Tween20.

11. The method according to claim 6, wherein the hapten is selected from the group consisting of: small molecule drugs, antibiotics, hormones, metabolites, polysaccharides, lipids and short peptides.

12. The method according to claim 6, wherein the hapten has a molecular weight of 200 Da to 1500 Da.

13. The method of preparing a conjugate according to claim 6, comprising the steps of:
   1) Providing the glucose 6-phosphate dehydrogenase mutant in a buffer;
   2) providing the hapten or derivative thereof in an aprotic solvent;
   3) contacting the glucose 6-phosphate dehydrogenase mutant with the hapten or derivative thereof at 18° C. to 28° C. for 2 hours to 3 hours, so that the hapten or derivative thereof is conjugated with the glucose 6-phosphate dehydrogenase mutant to obtain the conjugate;
   4) optionally, purifying the conjugate by desalting;
   step 1) and step 2) are interchangeable or in parallel;
   the buffer is selected from the group consisting of: PBS, Tris, TAPS and TAPSO,
   The pH of the buffer is 6.0 to 8.0;
   the aprotic solvent is selected from the following one or a combination of: acetonitrile, dimethylformamide and dimethyl sulfoxide;
   the glucose 6-phosphate dehydrogenase mutant comprises one or more free sulfhydryl groups prior to step 3);
   contacting the glucose 6-phosphate dehydrogenase mutant with the hapten or derivative thereof at a molar ratio of 1:n; wherein n is from 1 to 200.

14. The method of preparing a conjugate according to claim 13, wherein n is from 30 to 120.

* * * * *